(12) United States Patent
Graef

(10) Patent No.: US 6,229,238 B1
(45) Date of Patent: May 8, 2001

(54) TRANSVERSAL FLUX MACHINE

(75) Inventor: Markus Graef, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/296,277

(22) Filed: Apr. 22, 1999

(30) Foreign Application Priority Data

Apr. 22, 1998 (DE) ............................................. 198 18 035

(51) Int. Cl.$^7$ ......................... H02K 21/12; H02K 41/03
(52) U.S. Cl. .................... 310/156; 310/164; 310/254
(58) Field of Search .................................. 310/254, 258, 310/259, 261, 162, 267, 152, 156, 268, 236, 163, 139, 164

(56) References Cited

U.S. PATENT DOCUMENTS

| | | | |
|---|---|---|---|
| 3,560,820 | 2/1971 | Unnewehr | 310/163 |
| 3,855,486 | * 12/1974 | Binder et al. | 310/216 |
| 4,831,298 | * 5/1989 | Lindgren | 310/266 |
| 4,935,650 | * 6/1990 | Hannan, III | 310/178 |
| 5,038,066 | * 8/1991 | Pawlak et al. | 310/263 |
| 5,220,232 | * 6/1993 | Rigney, II et al. | 310/156 |
| 5,334,898 | * 8/1994 | Skybyk | 310/268 |
| 5,334,899 | * 8/1994 | Skybyk | 310/268 |
| 5,598,046 | * 1/1997 | Miyazawa et al. | 310/257 |
| 5,955,806 | * 9/1999 | Devenyi | 310/266 |
| 5,964,028 | * 10/1999 | Buse | 310/42 |

FOREIGN PATENT DOCUMENTS

| | | |
|---|---|---|
| WO 88/06375 | 8/1988 | (DE) . |
| 39 04 516 C1 | 6/1990 | (DE) . |
| WO 90/09697 | 8/1990 | (DE) . |
| 91 16 192 U1 | 5/1992 | (DE) . |
| 43 00 440 C2 | 1/1994 | (DE) . |
| 44 00 443 | * 11/1994 | (DE) . |
| WO 95/04399 | 2/1995 | (DE) . |
| 43 25 740 C1 | 4/1995 | (DE) . |
| 0 677 914 1 A1 | 10/1995 | (EP) . |
| 0 712 199 1 A1 | 5/1996 | (EP) . |

* cited by examiner

Primary Examiner—Nestor Ramirez
Assistant Examiner—Karl E. Tamai
(74) Attorney, Agent, or Firm—Evenson, McKeown, Edwards & Lenahan, P.L.L.C.

(57) ABSTRACT

A transversal flux machine having a stator arrangement with a stator housing and at least one pole system arranged inside the stator housing and extending in the rotating direction. The pole system has an essentially U-shaped cross-section, and a ring winding received in the recess between the legs of the U-shaped cross-section and extending in the rotating direction, as well as having at least one rotor arrangement with at least one row of alternatingly arranged permanent magnets and soft-iron reflux elements. On the stator side, one retaining ring is provided on the rotor side of each ring winding respectively. The retaining ring has on both edge areas equidistantly spaced recesses for receiving radially inwardly projecting teeth of the pole rings and is used for stabilizing the pole system and the ring coil. On the rotor side, each row of alternatingly arranged permanent magnets and soft-iron reflux magnets extending in the rotating direction is held by a rotor support which has on each side an outer fastening ring with a projection extending at its radially outer end axially toward the inside, against which projection the permanent magnets and the soft-iron reflux elements are supported radially to the outside.

16 Claims, 7 Drawing Sheets

TRANSVERSAL FLUX MACHINE

BACKGROUND AND SUMMARY OF THE INVENTION

This application claims the priority of 198 18 035.7 filed Apr. 22, 1998, the disclosure of which is expressly incorporated by reference herein.

The invention relates to a transversal flux machine and a rotor arrangement for a transversal flux machine.

Permanent-magnet-excited synchronous machines according to the transversal flux concept are generally known and permit high force densities with high efficiency.

A transversal flux machine of the aforementioned type is described in European Patent Document EP 0 677 914. The transversal flux machine according to this document has a stator and a rotor as well as magnetic circuits. The flux of the magnetic circuits extends essentially transversely to the movement direction of the rotor. The stator has E-shaped pole elements, in the case of which the central pole shanks are arranged offset by one pole pitch with respect to the outer pole shanks. The permanent magnets of the rotor essentially have a cubical construction and are situated in their flux direction perpendicular to the adjoining pole surfaces of the pole elements, while they rotate between two shanks respectively of the E-shaped pole elements.

International Patent Document WO 90/09697 describes a permanent-magnet-excited electric machine which has an outer stator and at least one coaxial inner stator. A rotor rotates between these with two parallel rows of permanent magnets which extend at an axial distance from one another. Permanent magnets adjacent in the circumferential and axial direction have different polarities.

For the industrial manufacturing of such a machine, the outer stator and the inner stator are each constructed in three parts including a yoke ring and two laminated pole rings. The pole rings carry radially projecting pole teeth which are arranged in the rotating direction at a spacing of one pole pitch respectively. The laminated and segmented pole rings are pressed in the radial direction against the yoke ring and are supported in the axial direction on a ring web radially projecting from the yoke ring. One winding half-branch respectively of a ring-shaped pole winding is situated between the pole rings and the ring web. The winding half-branches in the outer and inner stator each form the pole winding.

International Patent Document WO 88/06375 discloses an electric machine in a transversal flux construction, in which an improvement is provided wherein the pole arrangement has an identical construction on the whole circumference and leakage flux components in the longitudinal direction are avoided. By means of this arrangement the magnetic resistance for the field components is reduced.

International Patent Document WO 95/04399 describes a transversal flux machine, wherein several winding branches are provided in the stator in the form of ring-shaped coils arranged coaxially with respect to the machine axis. These are embedded within sequences of C-shaped soft-iron elements arranged in the circumferential direction. The rotor and the partial rotors consist of permanent magnet elements and flux-guiding soft-iron elements which rotate in groove-type recesses of the soft-iron stator elements.

European Patent Document EP 0 712 199 illustrates a transversal flux machine with a number of outer soft-iron stator elements, with a plurality of inner soft-iron stator elements, one ring winding respectively of the outer and inner stator, and a rotor which, in turn, consists of mutually alternating magnets and soft-iron elements. In the case of this transversal flux machine, the magnets taper from the outside to the inside, and the width of the inner soft-iron stator elements is smaller than the width of the outer soft-iron stator elements.

All of the above-mentioned transversal flux arrangements have the disadvantage that their construction is not sufficiently stable in the transition area from the stator to the rotor. As a result, vibrations caused by the locally constantly changing attraction ratios between the rotating rotor and the stator, undesirable noises are developed. In addition, no optimal cooling is ensured in the case of the above-discussed transversal flux machines. Specifically, in the case of high-power transversal flux machines, noise development may occur which is of such a magnitude that efficiency deteriorates because of the higher conductor resistance and because the machine supplies less power because the magnetic properties deteriorate at higher temperatures. In an extreme case, its operability may even be endangered. In addition, the maximal constant power is lower while the cooling is insufficient.

It is an object of the invention to further develop a transversal flux machine of the aforementioned type, which generates little noise in its operation, so that mechanical stability, efficiency and capacity are increased and a functionally reliable operation can be ensured in the high-power range. In addition, a simple and low-cost manufacturing is permitted.

According to the present invention, this object is achieved by a transversal flux machine wherein, a retaining ring is provided on the stator side in each case between the ring winding and the rotor arrangement. The retaining ring has equidistantly spaced recesses at its two edge areas for receiving teeth of a pole or a pole system which project in the direction of the rotor arrangement.

The retaining ring is used for stabilizing the totality of the pole system and the ring coil so that, during an operation of the transversal flux machine, the individual pole elements move neither in the direction toward the rotor nor parallel thereto. Thus, vibrations are avoided in the stator range which may result in an increased generation of noise.

In addition, the retaining ring provides thermal shielding of the rotor and the stator so that heat generated in the stator arrangement cannot be transmitted unhindered to the rotor.

The intensity of the magnetic flux currents in the rotor—thus in the permanent magnets and the soft-iron reflux elements—depends on the temperature of the permanent magnets. In particular, the magnetic properties deteriorate as the temperatures rise. Starting at defined limit temperatures, the magnetic properties of the permanent magnets are lost completely. The above-mentioned shielding is therefore particularly advantageous in the case of high-power transversal flux machines, in the case of which—at least on the stator side, a high heat development takes place.

In addition, it is possible to cool the retaining ring. In this case, the heat generated in the stator can be carried away in a simple manner, thereby increasing the maximal constant power of the whole arrangement. The shielding between the stator and the rotor is further increased by this measure.

According to an advantageous embodiment, cooling of the retaining ring can be achieved in that at least one cooling duct is constructed in this retaining ring. When a suitable liquid flows through the cooling duct, the heat can be carried away in a simple and efficient manner.

The retaining ring represents an optimal winding carrier for the ring coil but also the pole system so that, overall a compact total unit can be provided which is easy to manufacture.

In a preferred embodiment, the recesses in the retaining rings are constructed to be tapering, for example, essentially conically, in the direction of the rotor arrangement. By means of a complementary construction of the teeth of the pole system received in the recesses, the stability of the overall arrangement, particularly in the direction of the rotor, can be further improved. Furthermore, the induction decreases in the conical teeth. Also, the whole circumference of the machine is available for guiding the flux in the pole yoke. The thickness of the pole yoke in the radial direction is not subjected to any limitation, so that arbitrary values of the induction can be set in the pole yoke. This leads to lower iron losses, which is advantageous in the case of a machine which is to be operated at high frequencies.

According to another embodiment, the retaining ring consists of a ceramic material. Such a material combines the characteristics of high mechanical stability, electric inactivity, good thermal conductibility and/or non-magnetic material. The cooling ducts in such a retaining ring can be produced by joining two retaining ring parts, at least one part having surrounding, for example, groove-shaped recesses.

With a view to a particularly simple variant at reasonable cost, each pole system preferably consists of a ring-shaped pole yoke and two laterally adjoining pole rings. Each of these three parts can be produced separately, for example, by joining individual metal sheets or winding up a sheet metal strip. The pole rings can be produced like conventional sheet metal blanks by punching.

In the pole yoke-side area, the pole rings are preferably perforated by incisions or slots. Such a measure reduces the occurrence of eddy currents during the magnetic flux transition from the pole yoke to the pole rings or vice versa, so that losses can be minimized.

In a particularly simple embodiment of the invention, the individual stator elements, such as the pole yoke, the pole rings, the ring coil and the retaining rings are constructed as separate parts at a reasonable which are held together by means of a stator housing. A transversal flux machine of this type can be produced particularly easily.

The generation of noise can be reduced when the area of the stator arrangement facing the rotor has a smooth surface. This surface is composed of the side of the retaining ring or rings facing the rotor as well as of the surfaces of the teeth of the pole rings which face the rotor.

Another cooling possibility is obtained if at least one cooling duct is constructed in the stator housing. If several cooling ducts are constructed in the stator housing as well as in the retaining ring, the whole stator arrangement can be cooled in an extremely effective manner.

For solving the above-mentioned problems a stable arrangement must not only be ensured on the stator side but also on the rotor side. Thus, according to another aspect of the invention, the above-described object is provided by means of a rotor arrangement wherein the row of alternatingly arranged permanent magnets and soft-iron reflux elements extending in rotating direction is held by a rotor support which has on each side an outer fastening ring with a projection extending at its stator-side outer end axially toward the inside. This measure prevents that the individual elements, particularly permanent magnets and soft-iron reflux elements, move in the direction of the stator as the result of attracting or centrifugal forces.

If two rows of alternatingly arranged permanent magnets and soft-iron reflux elements extend in parallel next to one another, a central fastening ring is preferably provided in-between, and a ring-shaped holding band can be arranged at the stator-side outer end. Like the projection of the outer fastening ring, the ring-shaped holding band is used for fixing the rotor elements, particularly against a movement in the direction of the stator.

In a particularly preferred embodiment, recesses, which in the center fastening ring are spaced equidistantly from one another, are provided at the level of the soft-iron reflux elements for receiving permanent magnets. The arrangement of the permanent magnets in the recesses of the central fastening ring further increases the capacity of the machine.

A reduced straying of the magnets which are not situated in the recesses of the central fastening ring is achieved by a lengthened construction of the permanent magnets in the radial and/or axial direction with respect to the soft-iron reflux elements.

The quiet running of the transversal flux machine can be further increased particularly by a plane construction of the stator-side surface of the rotor.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
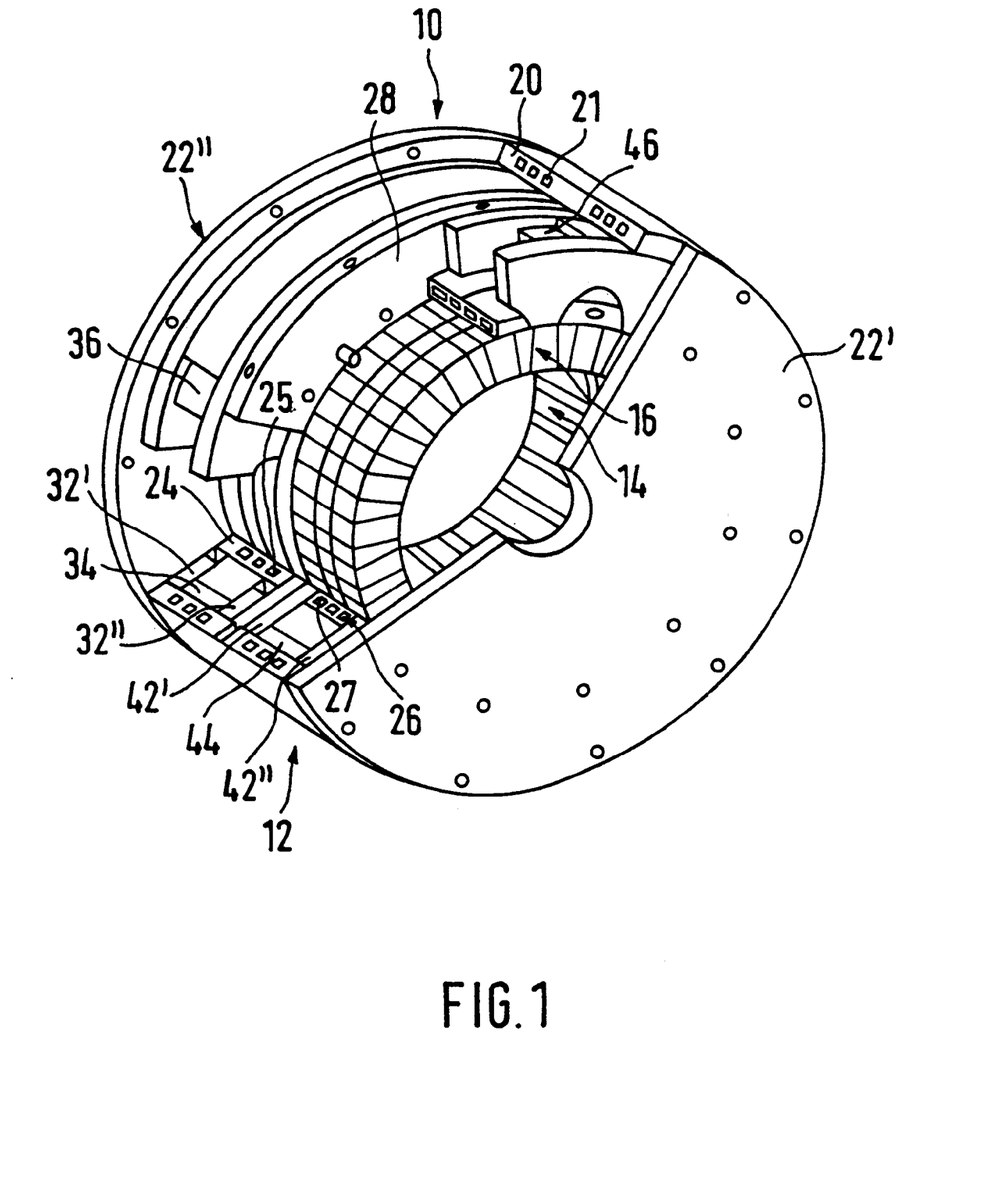
FIG. 1 is a perspective partial sectional view of an embodiment of a transversal flux machine according to the invention, consisting of a stator arrangement with two stator phases and a rotor arrangement with two rotor phases.

FIG. 1 is a perspective partial sectional view of an overall arrangement of an embodiment of a transversal flux machine 10 according to the invention. This transversal flux machine 10 comprises a stator arrangement 12 and a rotor arrangement 14, 16 which is coaxially and radially arranged on the inside of flux machine 10. The stator arrangement 12 as well as the rotor arrangement comprise two phases. A separate pole or armature system with a respectively assigned ring coil 36, 46 is provided for each phase. Each pole system with the ring coil 36, 46 extends in a ring-type manner in the rotating direction as well as axially in parallel to one another.

The entire transversal flux machine 10 is arranged in a housing which, in the present example, is composed of a ring-shaped outer housing part 20 and laterally adjoining housing side parts 22', 22". The mutually adjoining housing parts are screwed to one another. The outer housing side parts 22', 22" cover the opening of the ring-shaped outer housing part 20. In the center, a bore is provided in the housing side parts for the outlet of a drive shaft which is not shown.

Figure 7:
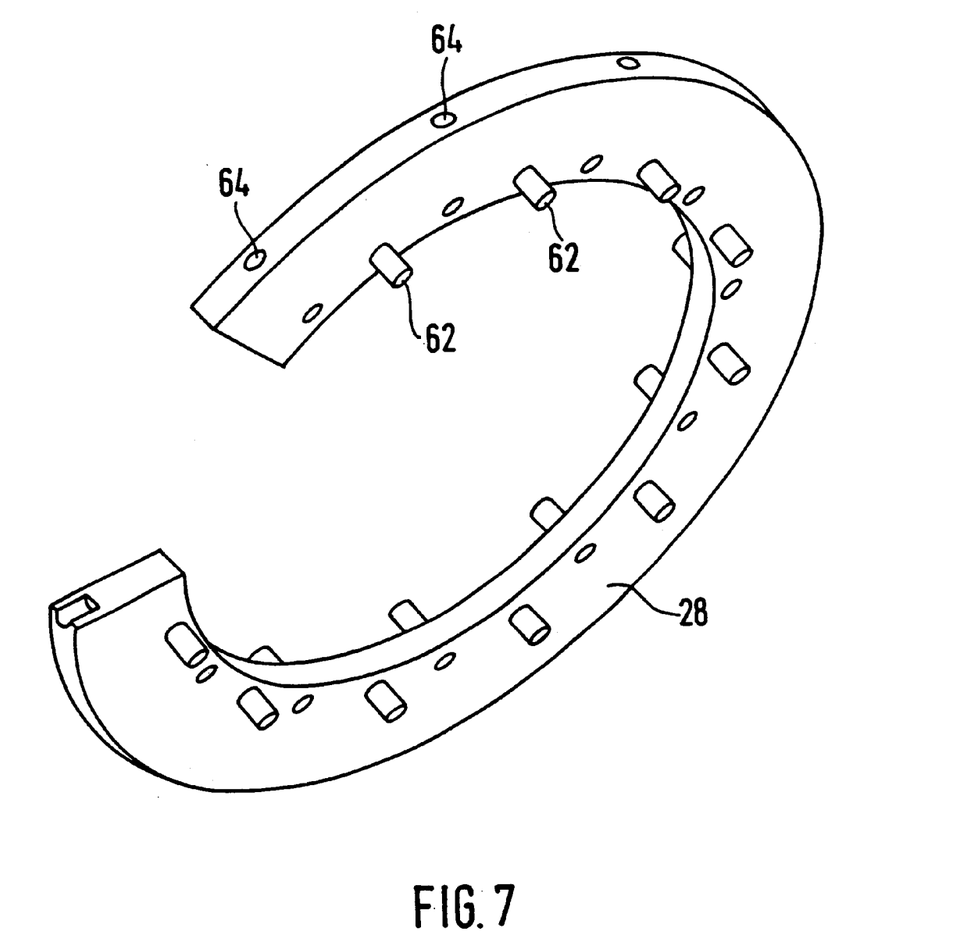
FIG. 7 is a perspective partial sectional view of a central housing part of the transversal flux machine according to FIG. 1.

Furthermore, in the present case, a central housing wall 28 is provided which extends in the center from the ring-shaped outer housing part 20 toward the inside and is illustrated in greater detail in FIG. 7. In the present case, the central ring-shaped housing wall 28 separates the two phases of the stator and comprises axially extending pins 62 which are caused to engage with the pole or armature arrangement of each phase to be described later for an alignment and a fixing. On the outer circumferential surface of the central housing wall 28, threaded bores 64 are provided by means of which the central housing wall 28 can be tightly connected to the ring-shaped outer housing part 20.

Each phase of the stator arrangement consists of a pole system 32', 32", 34 and 42', 42", 44, of a ring coil 36 and 46 and of a pertaining stator retaining ring 24 and 26.

In the present embodiment, each pole system 32', 32", 34 and 42', 42", 44 is composed of three parts, specifically with a pole yoke 34, 44 and pole rings 32', 32" as well as 42', 42" adjoining on its faces. On the whole, each pole system is constructed as a ring-shaped unit with an essentially U-shaped cross-section.

As an alternative, the pole rings may be adjoined radially on the inside to the two lateral areas of the poly yoke. The housing must then have a corresponding construction.

Figure 5:
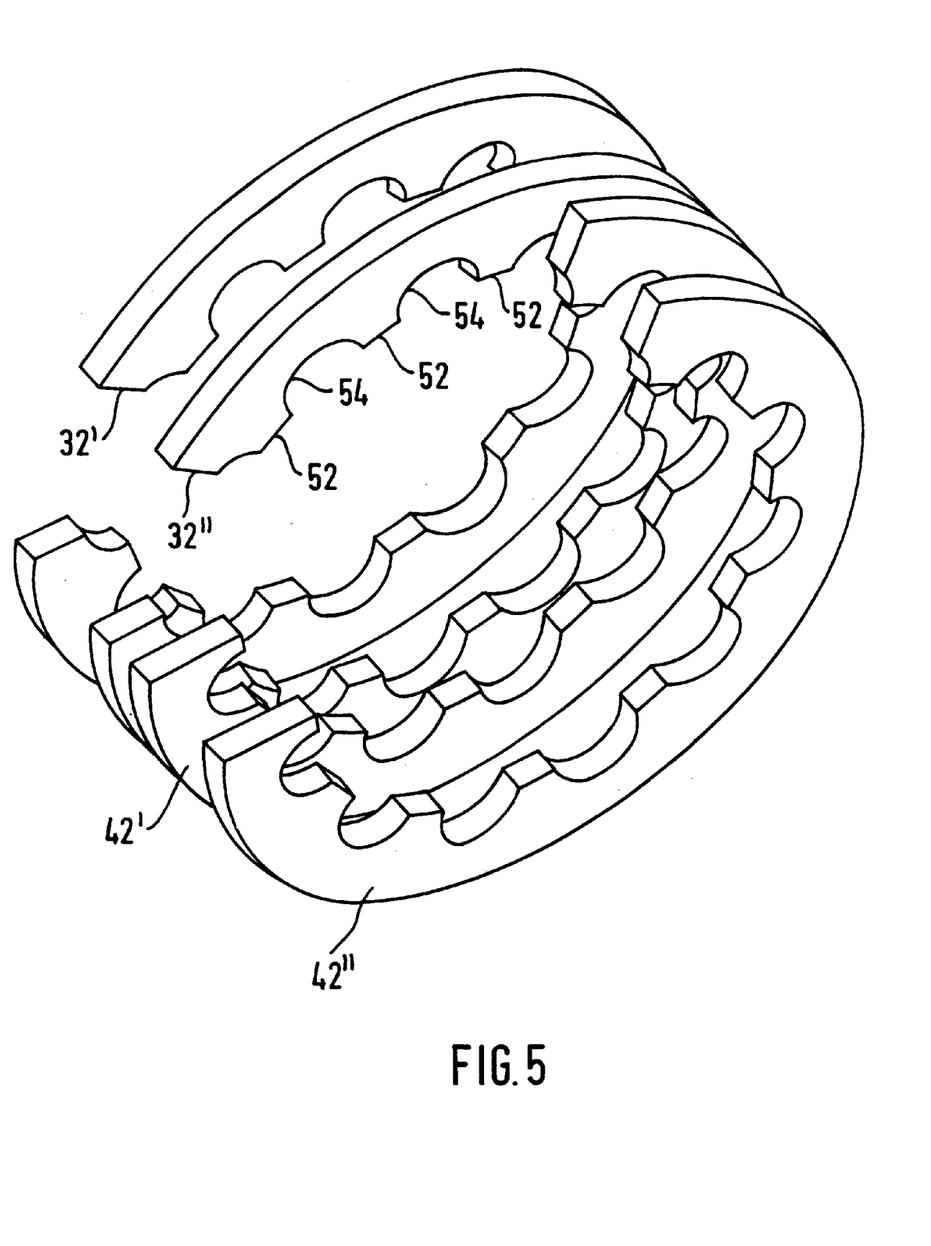
FIG. 5 is a perspective partial sectional view of the pole rings of a stator arrangement of the transversal flux machine according to FIG. 1.

According to FIG. 5, the pole rings 32', 32" and 42', 42" have in their radially interior area equidistantly spaced teeth 52 which are formed by also equidistantly spaced, approximately semicircular recesses 54.

The magnetic flux to the elements of the rotor arrangement takes place by way of the teeth 52 of the pole rings 32', 32" and 42', 42" as described below. To this extent, the present pole system has the same effect as the same number of U-shaped soft-iron pole elements spaced from one another corresponding to the number of teeth of a pole ring. However, the pole systems introduced in this embodiment permit a much simpler and lower-cost manufacturing. In addition, the induction decreases in the conical teeth. This leads to lower losses of iron.

The pole rings 32', 32" and 42', 42" as well as the pole yokes 34 and 44 can easily be manufactured from individual metal sheets (laminated pole rings).

As an alternative, the pole yoke may also have a different construction, for example, of a plurality of separate sheet metal strips arranged in the circumferential direction of the pole yoke. This measure can minimize eddy current losses in the pole yoke.

For reducing the eddy current losses in the transition from the pole yokes 34, 44 to the pole rings 32', 32" and 42', 42" and vice versa, notches 50 are provided on the outer areas of the pole rings 32', 32" and 42', 42". Notches 50 extend radially to the inside in the circumferential direction (compare FIG. 4) and result in a type of perforation.

Figure 3:
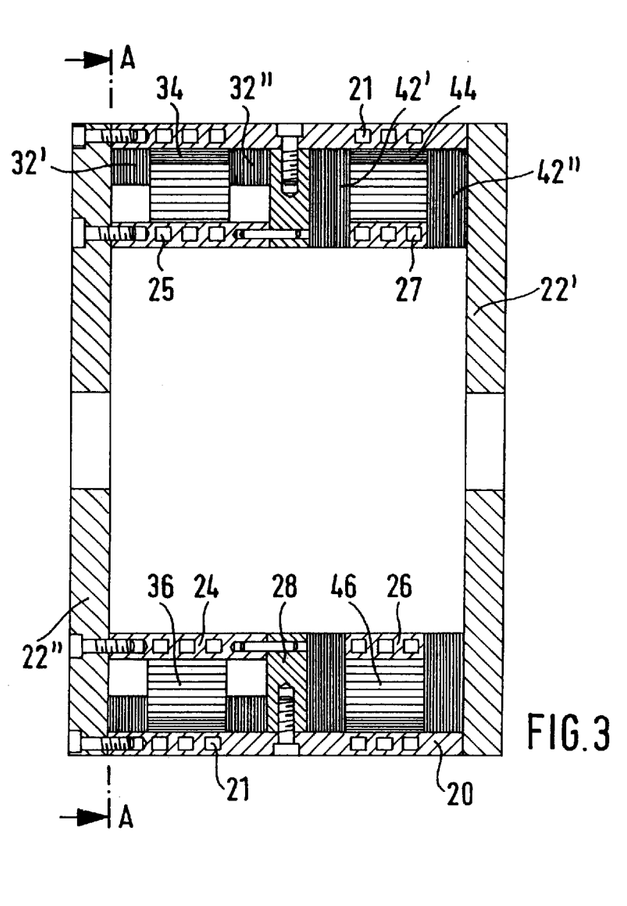
FIG. 3 is a sectional view of the stator arrangement of the transversal flux machine according to FIG. 1.
Figure 4:
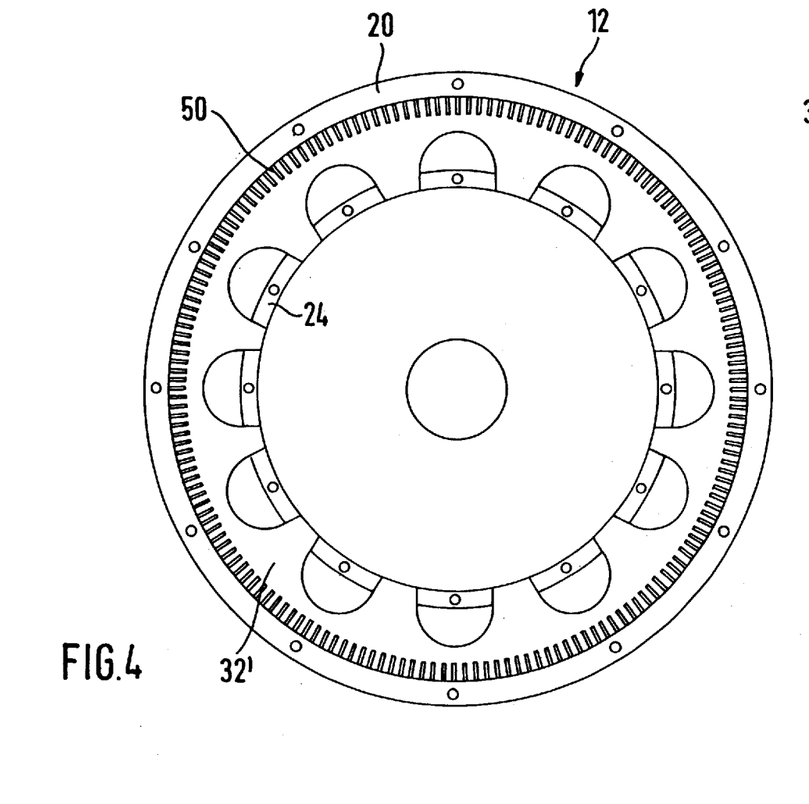
FIG. 4 is a sectional view along plane A—A of FIG. 3.

FIG. 4 is a sectional view according to plane A—A of FIG. 3 which shows that, in the present embodiment, the two phases are angularly offset with respect to one another by a pole pitch. This ensures that the start in the operation of the transversal flux machine 10 can be controlled without any problems.

FIG. 3 also illustrates that each pole system consisting of pole rings 32', 32" and 42', 42" and the pertaining pole yoke 34, 44 is arranged on a respectively assigned stator retaining ring 24, 26.

Figure 6:
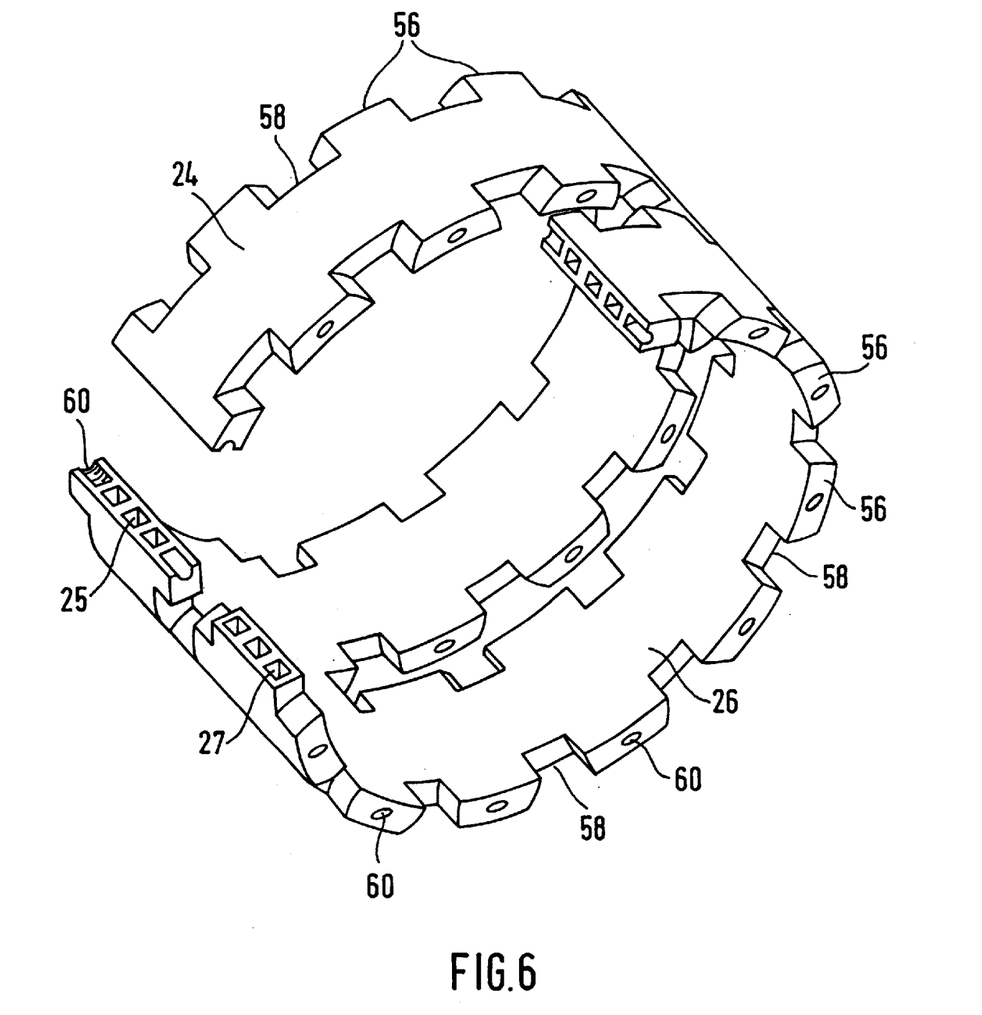
FIG. 6 is a perspective partial sectional view of the retaining rings of a transversal flux machine according to FIG. 1.

These stator retaining rings 24 and 26 are illustrated in a perspective detail view in FIG. 6. It is clearly demonstrated that the essentially ring-shaped stator retaining rings 24 and 26 have recesses 58 constructed corresponding to the arrangement of the teeth 52 of the pole rings, into which recesses 58 the teeth 52 of the pole rings 32', 32" and 42', 42" engage in the assembled condition. In the present embodiment, the recesses 58 as well as the projections 56, having threaded bores 60, have a construction which tapers toward the rotor, so that an extremely precisely fitting and stability-increasing joining of the pole system and the retaining ring 24, 26 can be obtained. This type of an assembly results in an extremely good stability so that movements of the teeth 52 of the pole system are avoided either in the direction of the rotor or in parallel to its moving direction.

The respective retaining ring coil 36, 46 is received in the recess formed by the U-shaped profile of the pole system and the respective retaining ring 24, 26. On the whole, quite a compact unit is therefore achieved.

Figure 2:
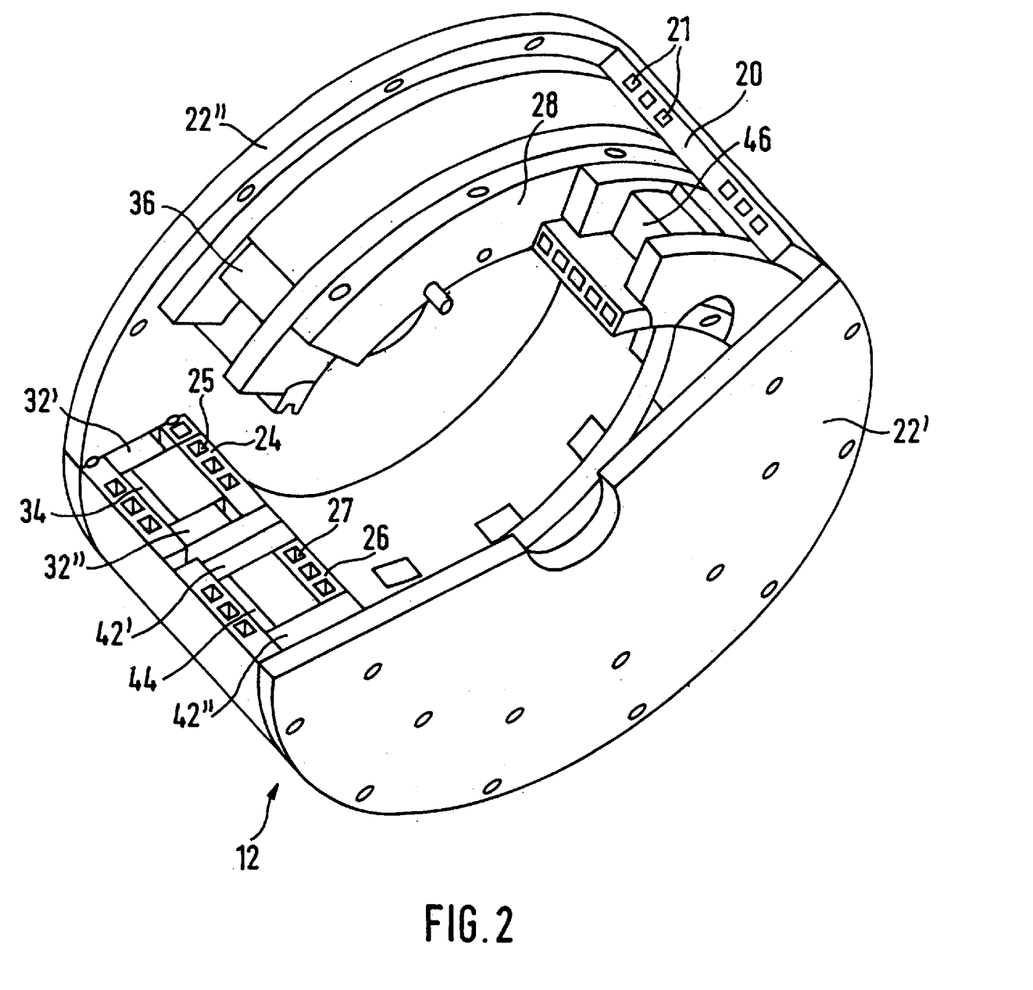
FIG. 2 is a perspective partial sectional view of the stator arrangement of the transversal flux machine according to FIG. 1.

As illustrated among other things in FIGS. 1 and 2, three cooling ducts 25, 27 respectively constructed in the rotating direction are provided in the stator retaining rings 24 and 26. In these cooling ducts 25, 27, the heat generated in the transversal flux machine can be carried away very rapidly and efficiently. The above-described stator retaining rings 24 and 26 are therefore multifunctional elements. They ensure, on the one hand, a special stability of each pole system or of the stator arrangement so that vibrations can be avoided. As a result, the generating of noise can be reduced. On the other hand, by means of the stator retaining rings, an particularly effective cooling can be carried out of the stator arrangement as well as of the rotor. This has an overall positive effect on the efficiency of the transversal flux machine. Particularly in the case of high-power transversal flux machines, no heat development can occur which can endanger the whole method of operation of the arrangement. In other words, the maximal constant power of a transversal flux machine can also be increased by means of such an efficient cooling.

A further improvement can be obtained by the additional cooling of the stator housing. In the present case as illustrated, for example, in FIGS. 1 and 2, additional cooling ducts 21 are provided in the outer housing part 20 which permit an even more efficient cooling of the stator arrangement.

The particularly simple construction of the present transversal flux machine 10 is illustrated, for example, in FIG. 3. This sectional view shows that the housing side parts 22' and 22" are in each case screwed to the outer housing part 20 but also to the respectively adjoining stator retaining rings 24 and 26. The stator retaining rings 24 and 26 are, in turn, connected with one another as well as with the outer housing part 20 by way of the central housing wall 28. This arrangement creates ring-shaped hollow spaces in which the respective pole systems with the respectively assigned ring windings 36 and 46 are not only received but also tightly joined together.

The respective unit 32', 32", 34, 36 and 42', 42", 44, 46, consisting of the pole rings, the pole yoke and the ring coil, is therefore loosely but nevertheless very compactly held together in these recesses.

Furthermore, if the stator retaining rings 24 and 26 are made of a magnetic material, these stator retaining rings 24 and 26 represent a reflux possibility for center magnets (102') of the rotor arrangement which stand between the teeth in such a manner that their field lines do not penetrate the coil.

As an alternative, the central housing wall 28 can naturally also consist of two parts so that a separate housing is available for each phase of the stator arrangement, which housings can again be screwed to one another.

An embodiment of a rotor arrangement, as illustrated in FIG. 1, will be explained in detail in the following by means of FIGS. 8 to 12. The method of operation of a rotor is sufficiently known and will therefore not be explained here.

A weak point of previous transversal flux machines is, on the one hand, the ensuring of a secure fastening of the individual rotor elements of the rotor arrangement against the occurring centrifugal forces directed radially to the outside, but on the other hand, providing a simple and low-cost construction, in which case an automated manufacturing process of the rotor arrangement must be capable.

In the present embodiment of a rotor arrangement 14, 16, two rows of respectively alternatingly arranged permanent magnets 102 and soft-iron reflux elements 100 are provided which have magnetic flux alignment marked by arrows. These two rows extend in a ring shape in parallel to one another, as illustrated in FIGS. 1 and 8 to 12. The alternating alignment of the permanent magnets 102 is also indicated as an example in FIG. 10. Each row of alternatingly arranged permanent magnets 102 and soft-iron reflux elements 100 is arranged on a rotor retaining ring 114', 114", the permanent magnet elements protruding axially as well as radially beyond the soft-iron reflux elements 100. This measure prevents an excessive leakage flux in the case of the permanent magnets 102.

Between the two rows of the alternatingly arranged permanent magnets 102 and soft iron elements 100, a central fastening ring 110 is arranged, to whose outer radial end a ring-shaped holding band 116 is screwed. This holding band 116 protrudes axially in each case beyond the central fastening ring 110 and supports the permanent magnets 102 and soft-iron reflux elements 100 in the stator direction. At each outer end of a rotor retaining ring 114', 114", one outer fastening ring 112' and 112" respectively is in each case screwed on at the face side, which has, on its radially exterior end, a projection which protrudes toward the inside in the axial direction and which extends at the same radial distance as the ring-shaped holding band 116. The two projections of the outer fastening rings 112', 112" hold the permanent magnets 102 and the soft-iron reflux elements 100 in a claw-type manner and support them against the centrifugal force in the direction of the stator.

As illustrated in FIGS. 8 and 10 to 12, the central fastening ring 110 has recesses at the level of the soft-iron reflux elements 100, in which recesses additional permanent magnets 102' are arranged according to an alignment illustrated in the direction of the arrow. With respect to their flux direction, these permanent magnets 102' are arranged such that a flux separation is obtained in a suitable manner. They are also secured against the centrifugal forces by means of the holding band 116.

By means of the above-described rotor arrangement, a particularly stable and simply constructed unit can be achieved, in which case only screwed connections must be made between the outer fastening rings 112', 112" and the respective rotor retaining rings 114', 114" as well as between the central fastening ring 110 and the ring-shaped holding band 116. The permanent magnets 102, 102' and the soft-iron reflux elements 100 are held in a form-rigid manner.

Figures 8, 9:
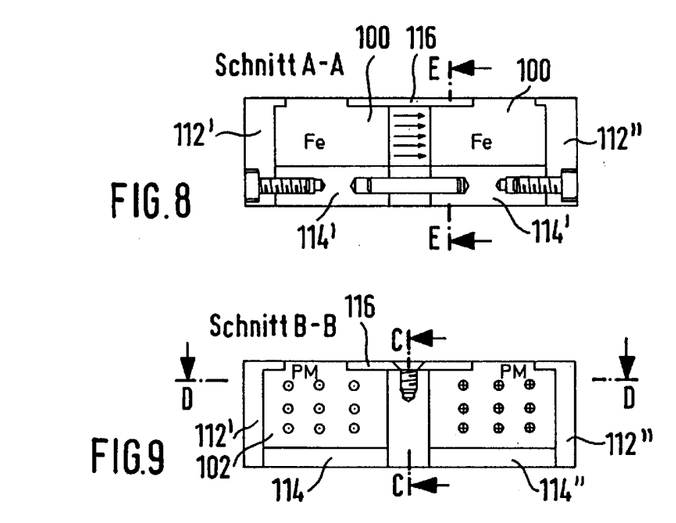
FIG. 8 is a sectional view of a rotor arrangement of the transversal flux machine according to FIG. 1 along plane A—A of FIG. 11.
FIG. 9 is a sectional view of the rotor arrangement of the transversal flux machine according to FIG. 1 along plane B—B of FIG. 11.
Figure 10:
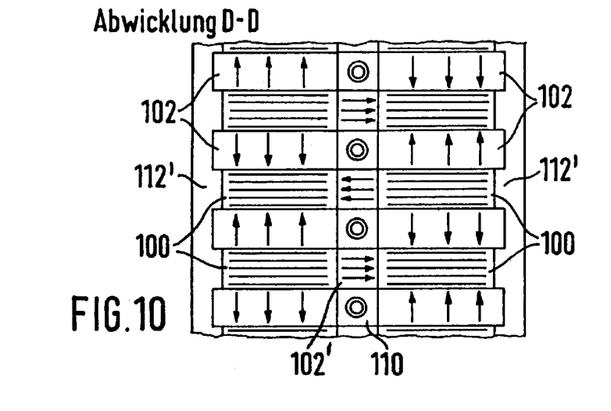
FIG. 10 is a partial sectional view of the rotor arrangement along plane D—D of FIG. 9.
Figure 11:
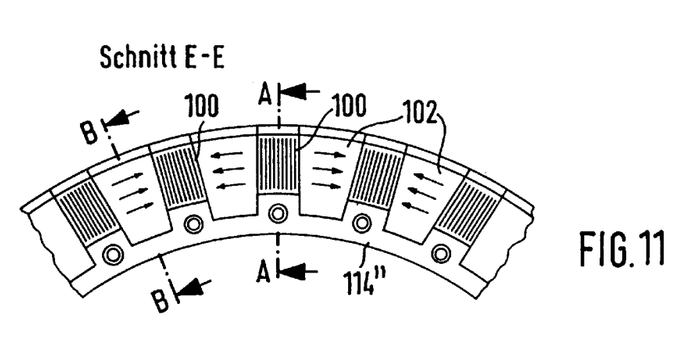
FIG. 11 is a partial sectional view of the rotor arrangement along plane E—E of FIG. 8.
Figure 12:
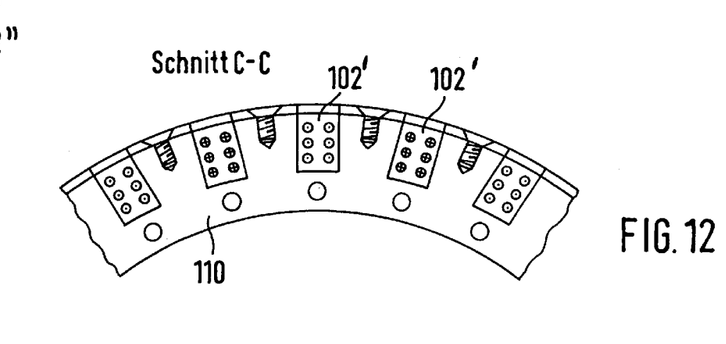
FIG. 12 is a partial sectional view of the rotor arrangement along plane C—C of FIG. 9.

The rotor arrangement according to FIGS. 8 and 12 represents the arrangement for one phase; in the case of two phases, two rotor arrangements of the same type can be used. According to the stator construction, these arrangements may also by angularly offset with respect to one another.

Likewise, the two ring-shaped arrangements of permanent magnets 102, 102' and soft-iron reflux elements 100 of a phase may also be angularly displaced with respect to one another. This depends on the stator arrangement. The tooth division of he stator arrangement or of the rotor arrangement will not be discussed in more detail since these concepts are sufficiently known from the state of the art.

On the whole, by means of the present transversal flux machine, a unit can be implemented which can be constructed automatically in a particularly simple manner at reasonable cost and which permits a secure operation in an effective manner. In particular, an operation in the high-power range can be implemented.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A transversal flux machine comprising:
    a stator arrangement comprising a stator housing, at least one pole system arranged inside the stator housing and extending in a rotating direction, the pole system having an essentially U-shaped cross-section recess, and at least one ring coil positioned in the U-shaped recess and extending in the rotating direction;
    at least one rotor arrangement having at least one row of alternatingly arranged permanent magnets and soft-iron reflux elements; and
    at least one retaining ring arranged on the stator side between the ring coil and the rotor arrangement, wherein;
    the pole system has a plurality of substantially planar teeth formed thereon and projecting in a direction of the rotor arrangement to stabilize the pole system and the ring coil; and
    the retaining ring has equidistantly spaced recesses on an edge area to receive said teeth.

2. Transversal flux machine according to claim 1, wherein the recesses taper in the direction of the rotor arrangement and the teeth of the pole system received in the recesses have a complementary construction.

3. Transversal flux machine according to claim 2, wherein each pole system comprises a ring-shaped pole yoke and two pole rings adjoining lateral areas of the pole yoke.

4. Transversal flux machine according to claim 2, wherein the retaining rings and the teeth have a smooth surface facing the stator side.

5. Transversal flux machine according to claim 2, wherein at least one cooling duct is constructed in the stator housing.

6. Transversal flux machine according to claim 1, wherein two pole systems are separated from one another by an intermediate element.

7. Transversal flux machine according to claim 1, wherein the retaining rings and the teeth have a smooth surface facing the stator side.

8. Transversal flux machine according to claim 1, wherein the stator housing has at least one cooling duct.

9. Transversal flux machine according to claim 1, wherein the retaining ring is ceramic.

10. A transversal flux machine comprising:
- a stator arrangement comprising a stator housing, at least one pole system arranged inside the stator housing and extending in a rotating direction, the pole system having an essentially U-shaped cross-section recess, and at least one ring coil positioned in the U-shaped recess and extending in the rotating direction;
- at least one rotor arrangement having at least one row of alternatingly arranged permanent magnets and soft-iron reflux elements; and
- at least one retaining ring arranged on the stator side between the ring coil and the rotor arrangement, wherein
- the pole system has a plurality of teeth formed thereon and projecting in a direction of the rotor arrangement to stabilize the pole system and the ring coil;
- the retaining ring has equidistantly spaced recesses on an edge area to receive said teeth; and
- each pole system comprises a ring-shaped pole yoke and two pole rings adjoining lateral areas of the pole yoke.

11. Transversal flux machine according claim 10, wherein the pole rings have perforations in the form of incisions or slots such that formation of eddy currents is reduced in a magnetic flux transition between the pole yoke to the pole rings.

12. Transversal flux machine according to claim 10, wherein pole yoke, the pole rings, the ring coil and the retaining ring are each constructed as separate parts which are held together by the stator housing.

13. Transversal flux machine according to claim 10, wherein at least one cooling duct is constructed in each retaining ring.

14. A transversal flux machine comprising:
- a stator arrangement comprising a stator housing, at least one pole system arranged inside the stator housing and extending in a rotating direction, the pole system having an essentially U-shaped cross-section recess, and at least one ring coil positioned in the U-shaped recess and extending in the rotating direction;
- at least one rotor arrangement having at least one row of alternatingly arranged permanent magnets and soft-iron reflux elements; and
- at least one retaining ring arranged on the stator side between the ring coil and the rotor arrangement, wherein
- the pole system has a plurality of teeth formed thereon and projecting in a direction of the rotor arrangement to stabilize the pole system and the ring coil;
- the retaining ring has equidistantly spaced recesses on an edge area to receive said teeth; and
- each retaining ring has at least one cooling duct.

15. Rotor arrangement for a transversal flux machine, comprising:
- at least one row of alternatingly arranged permanent magnets and soft-iron reflux elements, said at least one row extending in a rotating direction of the rotor; and
- a rotor support which holds said at least one row, and has on each side an outer fastening ring with an axially extending circumferential flange arranged at a stator-side outer periphery thereof and projecting toward an inside of the rotor support, against which flange the permanent magnets and the soft-iron reflux elements are supported;
- wherein the permanent magnets are radially and axially lengthened with respect to the soft-iron reflux elements.

16. A transversal flux machine having a stator arrangement comprising:
- a stator housing;
- at least one pole system arranged inside the stator housing, said pole system being formed to have a substantially U-shaped cross-section;
- at least one ring coil positioned in said U-shaped recess;
- at least one rotor arrangement comprising at least one row of alternately arranged permanent magnets and soft-iron reflux elements; and
- at least one retaining ring positioned between said ring coil and rotor arrangement; wherein
- said retaining ring further comprises equidistantly spaced recesses on an edge area adapted to receive teeth formed on said pole system; and
- said teeth are substantially planar, and project toward the rotor arrangement and are adapted to stabilize the pole system and ring coil.

* * * * *